UNITED STATES PATENT OFFICE.

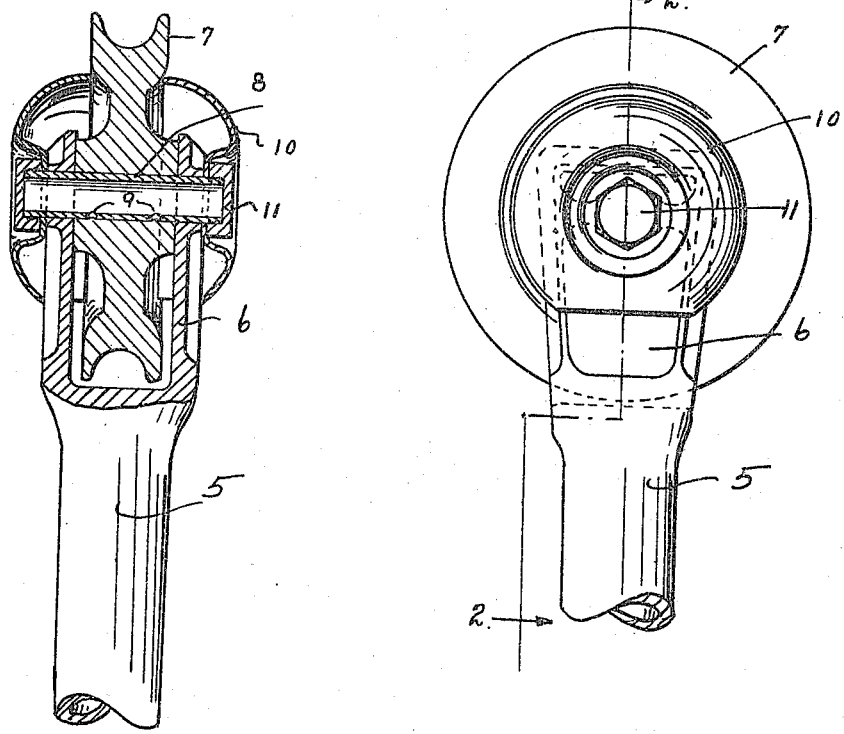

JOSEPH McMILLAN, OF GLENDALE, AND CLARENCE V. GREENAMYER, OF LOS ANGELES, CALIFORNIA.

TROLLEY.

1,221,763.  Specification of Letters Patent.  Patented Apr. 3, 1917.

Application filed March 6, 1916. Serial No. 82,356.

*To all whom it may concern:*

Be it known that we, JOSEPH McMILLAN and CLARENCE V. GREENAMYER, both citizens of the United States, said McMILLAN residing at Glendale, and said GREENAMYER at Los Angeles, in the county of Los Angeles and State of California, have invented new and useful Improvements in Trolleys, of which the following is a specification.

Our invention relates to guards on the harp of a trolley pole for an electric railway having an overhead feed wire and to means to lubricate the trolley wheel, and the object thereof is to provide a guard on the harp that will prevent the harp from catching the span wires in case the trolley wheel accidentally leaves the feed wire and simple means to oil the wheel.

In the drawings forming a part of this application:—

Figure 1 is a side elevation of a trolley harp equipped with our improvement.

Fig. 2 is a section on the line 2—2 of Fig. 1.

The trolley pole 5, harp 6 and trolley wheel 7 are of any approved construction. 8 is a hollow pin which passes through the harp and wheel and holds the wheel positioned. Within the wheel the pin is provided with ports 9 to permit grease which is placed within the hollow pin to flow therethrough to lubricate the wheel. Mounted upon the ends of pin 8 are pressed metal caps 10 which are held in place thereon by nuts 11 which screw upon the ends of pin 8 and close the open ends thereof thereby retaining grease in the pin. The central portions of caps 10 are depressed so as to chamber nuts 11 and the outer edges of caps 10 at the sides and upper portions are curved inwardly so as to lie within and close to the flange of wheel 7.

By this construction it will be seen that we have provided a guard so constructed and placed that if a trolley wheel accidentally leaves the feed wire when the car is running the guard will prevent the harp from catching hold of the span wires and breaking them.

Having described our invention what we claim is:

1. A trolley harp guard comprising plates secured upon the axle of the trolley wheel, said plates having the edges curved to lie within and close to the flange of the trolley wheel and being chambered at the central portions to receive and protect the fastening means on the ends of the axle of the trolley wheel.

2. In a trolley harp guard, plates mounted at the sides of the trolley wheel, said plates having edges the upper portions of which lie close to and within the flanges of the trolley wheel and the central portions being adapted to protect the ends of the axle of the trolley wheel from engaging the span wires in case the wheel accidentally leaves the feed wire.

In witness that we claim the foregoing we have hereunto subscribed our names November, 1915.

JOSEPH McMILLAN.
CLARENCE V. GREENAMYER.

Witness:
G. E. HARPHAM.

Copies of this patent may be obtained for five cents each, by addressing the "Commissioner of Patents, Washington, D. C."